United States Patent
Kitahara

(10) Patent No.: US 12,546,621 B2
(45) Date of Patent: Feb. 10, 2026

(54) TRAVELING TRACK GENERATION DEVICE AND TRAVELING TRACK GENERATION METHOD

(71) Applicant: DENSO CORPORATION, Kariya (JP)

(72) Inventor: Genki Kitahara, Kariya (JP)

(73) Assignee: DENSO CORPORATION, Kariya (JP)

( * ) Notice: Subject to any disclaimer, the term of this patent is extended or adjusted under 35 U.S.C. 154(b) by 556 days.

(21) Appl. No.: 17/931,790

(22) Filed: Sep. 13, 2022

(65) Prior Publication Data
US 2023/0003540 A1    Jan. 5, 2023

Related U.S. Application Data

(63) Continuation of application No. PCT/JP2021/010170, filed on Mar. 12, 2021.

(30) Foreign Application Priority Data

Mar. 16, 2020    (JP) ................. 2020-045571

(51) Int. Cl.
*G01C 21/36* (2006.01)
*G01C 21/32* (2006.01)

(52) U.S. Cl.
CPC ......... *G01C 21/3658* (2013.01); *G01C 21/32* (2013.01)

(58) Field of Classification Search
CPC .. B60W 30/12; B60W 2552/53; B60W 30/10; B60W 30/18154
See application file for complete search history.

(56) References Cited

U.S. PATENT DOCUMENTS

| | | | |
|---|---|---|---|
| 2010/0246889 A1 | 9/2010 | Nara et al. | |
| 2018/0148052 A1* | 5/2018 | Suto | B60W 40/06 |
| 2020/0200547 A1* | 6/2020 | Miller | G01C 21/3815 |
| 2020/0348146 A1 | 11/2020 | Yokota et al. | |

* cited by examiner

*Primary Examiner* — Kenneth J Malkowski
(74) *Attorney, Agent, or Firm* — Maschoff Brennan

(57) ABSTRACT

An entry point and an exit point are specified in a non-lane section. A lane definition line is searched to be continuous in a longitudinal direction of the road from the entry point to the exit point. A virtual lane marking line is generated to connect between the lane marking line on an entry side and the lane marking line on an exit side, based on the lane definition line detected as a search result. A travelling track is generated as a trajectory on which a vehicle is scheduled to travel, based on the virtual lane marking line.

15 Claims, 8 Drawing Sheets

TRAVELING TRACK GENERATION DEVICE AND TRAVELING TRACK GENERATION METHOD

CROSS REFERENCE TO RELATED APPLICATION

The present application is a continuation application of International Patent Application No. PCT/JP2021/010170 filed on Mar. 12, 2021, which designated the U.S. and claims the benefit of priority from Japanese Patent Application No. 2020-045571 filed on Mar. 16, 2020. The entire disclosures of all of the above applications are incorporated herein by reference.

TECHNICAL FIELD

The present disclosure relates to a traveling track generation device and a traveling track generation method.

BACKGROUND

There is known a technique for controlling the travelling of a vehicle (hereinafter referred to as lane reference control) with reference to the lane marking line that divides the traffic lanes in which the vehicles are traveling. In the lane reference control, a traveling track on which the vehicle travels is generated with reference to the lane marking line. Then, the vehicle control is performed based on the generated traveling track.

The area inside the intersection has no lane marking lines. A conceivable technique teaches a device for generating a traveling track for traveling in an intersection. The device in the conceivable technique aligns both ends of the trajectory when the vehicle actually travels in the intersection with the entry side lane network and the exit side lane network.

SUMMARY

According to an example, an entry point and an exit point are specified in a non-lane section. A lane definition line is searched to be continuous in a longitudinal direction of the road from the entry point to the exit point. A virtual lane marking line is generated to connect between the lane marking line on an entry side and the lane marking line on an exit side, based on the lane definition line detected as a search result. A travelling track is generated as a trajectory on which a vehicle is scheduled to travel, based on the virtual lane marking line.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
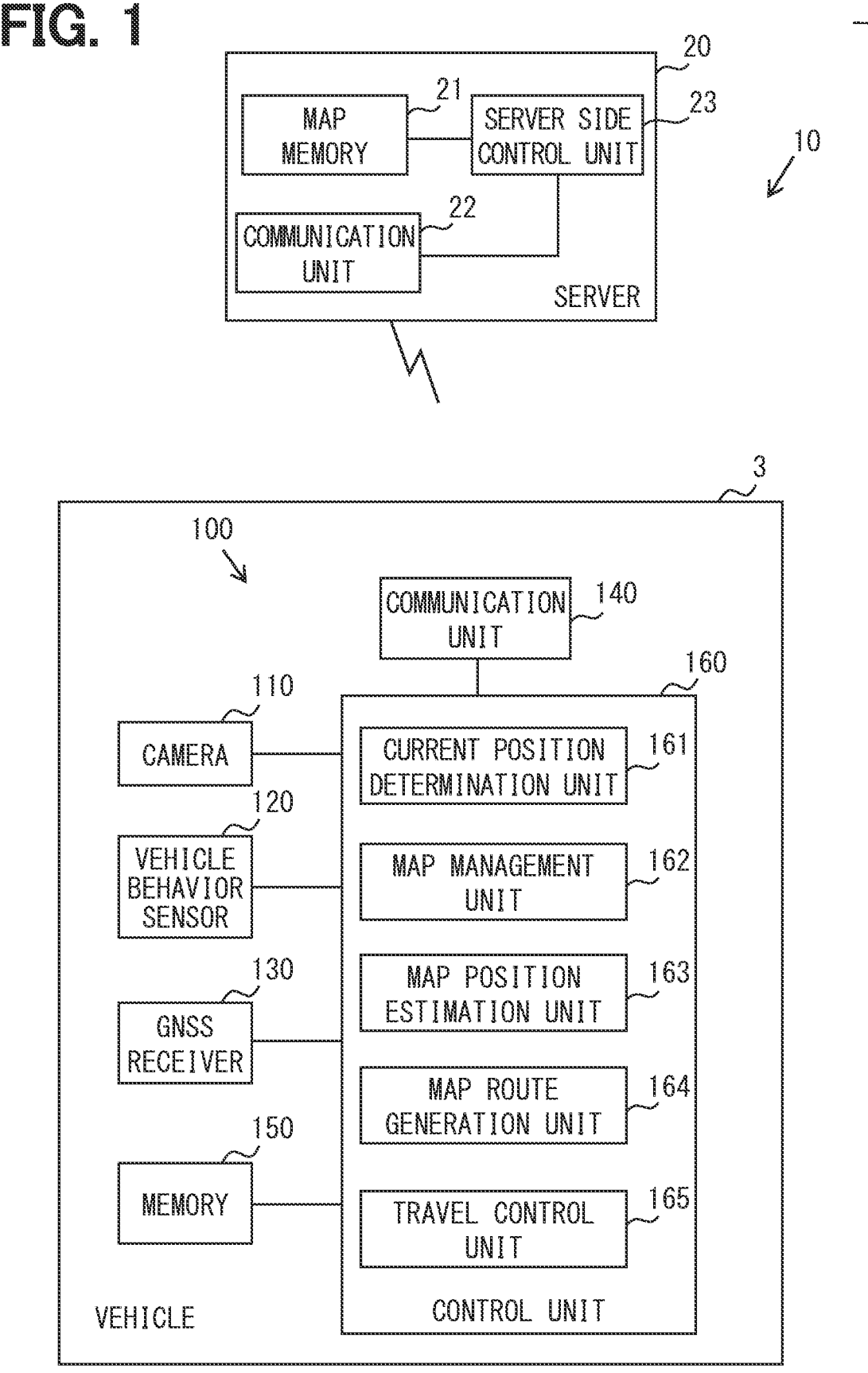
FIG. 1 is a diagram showing a configuration of a vehicle control system 10 including a vehicle control device.

In order to perform lane reference control, it may be desirable that lane marking lines exists for dividing the travelling lane on both the left and right sides of the vehicle. The inside of the intersection is not an area where the lane reference control is executed because the vehicle may turn left or right. However, although it may be desired to execute the lane reference control, there is an area where the lane marking line to be referred to does not exist. For example, a branching area, a merging area and the like has no lane marking line. Since the number of lanes increases or decreases in the branching/merging area, there is an area where the lane marking line is temporarily interrupted. In addition, there may be an area where the road width widens before the toll gate, and even in such an area, there is no lane marking line. Further, even if the number of lanes does not increase or decrease, there may be a region where the lane marking line does not exist in a part of the longitudinal direction of the road.

Since there is no lane marking line on either the left or right side, the section where the traffic lane is not defined by the lane marking line is hereinafter referred to as a non-lane section. It is conceivable to apply the technique disclosed in Patent Literature 1 to this non-lane section, the locus when the vehicle actually travels is stored in the map data, and the locus is used as the traveling track. However, if the map data includes the trajectory when the vehicle actually travels for the non-lane section, the map data capacity becomes too large.

The present embodiments are made based on this circumstance, and an object thereof is to provide a traveling track generation device and a traveling track generation method for generating a traveling track in a non-lane section while suppressing an increase in map data capacity.

One embodiment relating to a traveling track generation device for achieving the above objectives is a travelling track generation device including:

a point specifying unit that specifies an entry point and an exit point in a non-lane section in which no lane marking line is disposed on at least one of a right side and a left side in a width direction of a road, and a traffic lane is not defined by a lane marking line;

a search unit that searches for a lane definition line that is continuously disposed along a longitudinal direction of the road from a side of the entry point to a side of the exit point specified by the point specifying unit;

a virtual lane marking line generation unit that generates a virtual lane marking line for connecting between a lane marking line on the side of the entry point and a lane marking line on the side of the exit point in the non-lane section corresponding to the entry point and the exit point, based on the lane definition line detected as a search result of the search unit; and a travelling track generation unit that generates a travelling track as a trajectory on which a vehicle is scheduled to travel, based on the virtual lane marking line.

This traveling track generation device specifies the entry point and the exit point of the non-lane section, searches for the lane definition line for generating the virtual lane marking line based on the entry point and the exit point, and generates the virtual lane marking line connecting the lane marking line on the entry side and the lane marking line on the exit side of the non-lane section based on the searched lane definition line.

The traveling track generation unit processed this virtual lane marking line in the same manner as an actually existing lane marking line to generate a traveling track. Therefore, even if there is a non-lane section, it is possible to generate a traveling track in the same manner as in a section where there is actually a lane marking line. Further, since the virtual lane marking line is not stored in the map data, it is possible to suppress an increase in the map data capacity.

One embodiment relating to a traveling track generation method for achieving the above object is a method executed by the traveling track generation device and including:

specifying an entry point and an exit point in a non-lane section in which no lane marking line is disposed on at least one of a right side and a left side in a width direction of a road, and a traffic lane is not defined by a lane marking line;

searching for a lane definition line that is continuously disposed in a longitudinal direction of a road from a side of a specified entry point to a side of a specified exit point;

generating a virtual lane marking line connecting a lane marking line on an entry side and a lane marking line on an exit side in the non-lane section corresponding to the entry point and the exit point, based on the lane definition line detected as a search result; and generating a travelling track as a trajectory on which a vehicle is scheduled to travel, based on the virtual lane marking line.

The following will describe an embodiment of the present disclosure with reference to the drawings. FIG. 1 is a diagram showing a configuration of a vehicle control system 10 including a vehicle control device 100 that also functions as a traveling track generation device. The vehicle control system 10 includes a vehicle control device 100 mounted on the vehicle 3 and a server 20 installed at a place different from the vehicle 3.

(Configuration of Server 20)

The server 20 includes a map memory 21, a communication unit 22, and a server-side control unit 23. The map memory 21 includes a rewritable non-volatile storage medium, and high-precision map data is stored in the storage medium. The high-precision map data includes data representing information in the width direction of the road in addition to data representing the shape in the longitudinal direction of the road. The information in the width direction of the road includes information indicating the number of lanes, the position of the lane marking line L, the type of the lane marking line L, the road sign, the road edge line, and the like.

Further, in the present embodiment, the high-precision map data includes the coordinates of the entry point PIN and the exit point POUT of the non-lane section NLS. The non-lane section NLS is a section in which the position of the traffic lane cannot be defined by the lane marking line L because there is no lane marking line L on at least one of the right side and the left side. Here, it is defined that there is a lane marking line L in a section where road markings for defining lanes such as broken lines and road studs are continuous at specified intervals. Further, the non-lane section NLS is a section in which there are areas having lane marking lines L on both the left and right sides in the front and rear in the longitudinal direction of the road, and the lane can be estimated from the lane marking lines L in the front and rear in the longitudinal direction of the road. The non-lane section NLS is a section in which at least one of the left and right lane marking lines L does not exist in the estimated lane.

Figure 2:
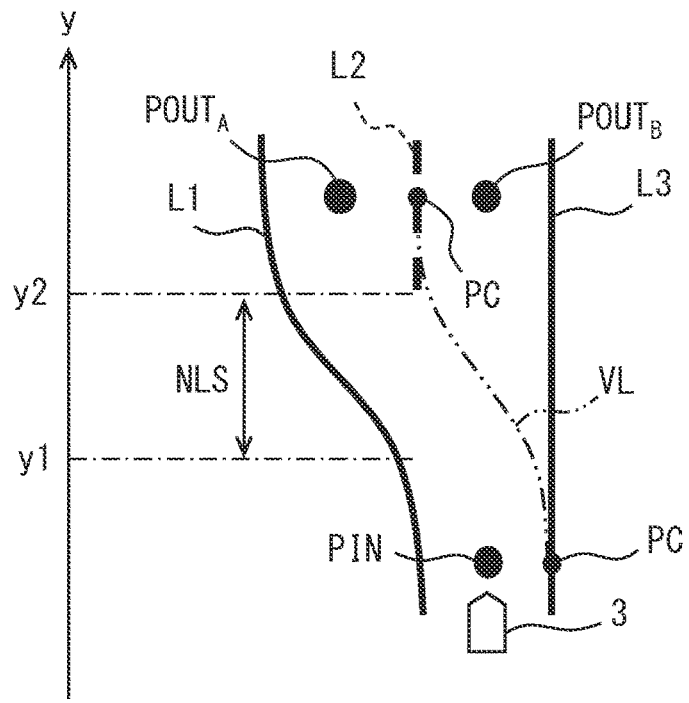
FIG. 2 is a diagram illustrating an non-lane section, an entry point, and an exit point.

FIG. 2 is a diagram illustrating an non-lane section NLS, an entry point PIN, and an exit point POUT. In the non-lane section NLS, since there is no lane marking line L at least on the left or right, even if there is another lane marking line L, the distance between the lane marking line L adjacent to another lane marking line L or the road boundary line is longer than the lane width.

In FIG. 2, lane marking lines L1 and L3 exist at intervals of a lane width on the left and right sides of the position where the vehicle 3 is disposed, but the lane marking line L1 on the left side in the traveling direction of the vehicle 3 is curved toward the side away from the other lane marking line L3. Therefore, in the y coordinate, which is the coordinate along the road, the non-lane section NLS starts from y1. When the y coordinate becomes y2, the lane marking line L2 is appeared, and the non-lane section NLS ends at y2.

The position of the entry point PIN in the longitudinal direction of the road is an arbitrary point disposed between a predetermined distance before entering the non-lane section NLS and a point entering the non-lane section NLS. The predetermined distance is about several meters to several tens of meters. The position of the entry point PIN in the road width direction is at or near the center of the lane in the width direction.

The position of the exit point POUT in the longitudinal direction of the road is an arbitrary point disposed between the position of exiting the non-lane section NLS to a predetermined distance after exiting the non-lane section NLS. The predetermined distance is the same as in the case of the entry point PIN. The position of the exit point POUT in the road width direction is at or near the center of the road in the width direction. In FIG. 2, since the road branches, the exit point POUT is shown as two exit points POUTA and POUTB.

The communication unit 22 is a communication unit capable of wide area wireless communication. The server-side control unit 23 is configured to include at least one processor. For example, the server-side control unit 23 can be realized by a computer including a processor, a non-volatile memory, RAM, I/O, and a bus line connecting these configurations. The server-side control unit 23 controls the map memory 21 and the communication unit 22. For example, the server-side control unit 23 extracts high-precision map data to be transmitted from the map memory 21 to the vehicle control device 100, and transmits the extracted high-precision map data from the communication unit 22 to the vehicle control device 100.

[Configurations of Vehicle Control Device 100]

The vehicle control device 100 includes a camera 110, a vehicle behavior sensor 120, a GNSS receiver 130, a communication unit 140, a memory 150, and a control unit 160. These are mounted on the vehicle 3. The camera 110 detects an object existing around the vehicle 3 through image processing. The objects detected by the camera 110 includes a lane marking line L drawn on the road surface, a road edge line, and the like. In place of or in addition to the camera 110, other devices such as LIDAR may be provided to detect objects disposed around the vehicle 3.

The vehicle behavior sensor 120 includes a speed sensor, an acceleration sensor, and a yaw rate sensor. The speed sensor detects the speed of the vehicle 3. The acceleration sensor detects the acceleration acting on the vehicle 3. The acceleration sensor detects the acceleration in the front-rear direction of the vehicle 3 and the yaw angle of the vehicle 3 based on the detected values.

The GNSS receiver 130 receives a navigation signal transmitted by a navigation satellite included in the GNSS (Global Navigation Satellite System), which is a satellite navigation system, and sequentially calculates the current position based on the received navigation signal.

The communication unit 140 is capable of wide area communication. The communication unit 140 can perform wide area wireless communication with the communication unit 22 included in the server 20.

The memory 150 includes a writable storage medium such as a flash memory, and stores high-precision map data downloaded from the server 20.

The control unit 160 includes at least one processor. For example, the control unit 160 can be realized by a computer including a processor, a non-volatile memory, RAM, I/O, and a bus line connecting these configurations. The non-volatile memory stores a program for operating a general-purpose computer as a control unit 160. When the processor executes the program stored in the non-volatile memory while using the temporary storage function of the RAM, the control unit 160 functions as the current position determination unit 161, the map management unit 162, the map position estimation unit 163, and the map route generation unit 164 and a travel control unit 165. Execution of the operations corresponds to an execution of a method implemented by the program. The method corresponding to the program includes a traveling track generation method.

The current position determination unit 161 sequentially determines the current position of the vehicle 3 by sequentially acquiring the current position determined by the GNSS receiver 130. The current position of the vehicle 3 can also be determined by a method other than satellite navigation using the GNSS receiver 130. For example, the current position may be sequentially determined by autonomous navigation based on the vehicle behavior detected by the vehicle behavior sensor 120, or hybrid navigation that combines autonomous navigation and satellite navigation using the GNSS receiver 130.

The map management unit 162 manages the high-precision map data stored in the memory 150. The map management unit 162 downloads high-precision map data in a range determined based on the current position determined by the current position determination unit 161 every time the vehicle travels a certain distance from the server 20 via the communication unit 140. Then, the downloaded high-precision map data is stored in the memory 150. When the high-precision map data is already stored in the memory 150, the high-precision map data stored in the memory 150 is updated with the downloaded high-precision map data this time.

Figure 3:
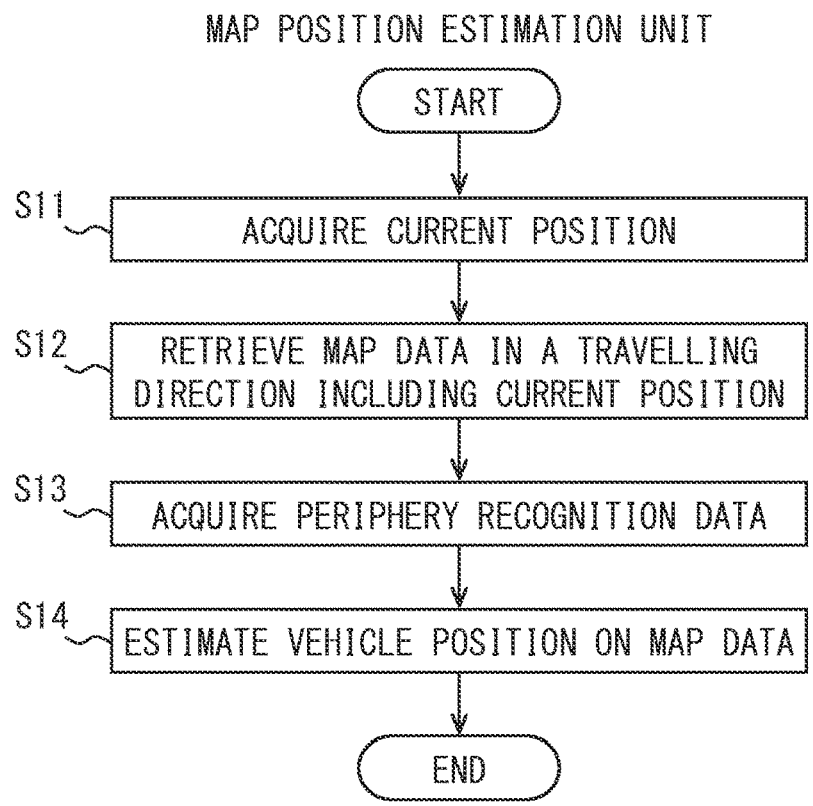
FIG. 3 is a diagram showing a process executed by a map position estimation unit in FIG. 1.

The map position estimation unit 163 estimates the current position of the vehicle 3 on the high-precision map. FIG. 3 shows a process executed by the map position estimation unit 163. The map position estimation unit 163 executes the process shown in FIG. 3 in a position estimation cycle set to about several tens of milliseconds to several hundreds of milliseconds.

Step (hereinafter, the step is omitted) in S11, the current position of the vehicle 3 is acquired from the current position determination unit 161. In S12, high-precision map data in a predetermined range in the traveling direction including the current position is extracted from the high-precision map data downloaded from the server 20 and stored in the memory 150. The extracted data is stored in the RAM. The process of S12 may be executed in a cycle longer than the position estimation cycle.

In S13, data that recognizes the periphery of the vehicle 3, such as image data captured by the camera 110, is acquired. In S14, the current position of the vehicle 3 on the high-precision map data is estimated by matching the high-precision map data extracted in S12 with the peripheral recognition data acquired in S13. The estimated current position has an accuracy that can determine the relative position of the vehicle 3 with respect to the lane marking line L.

Figure 4:
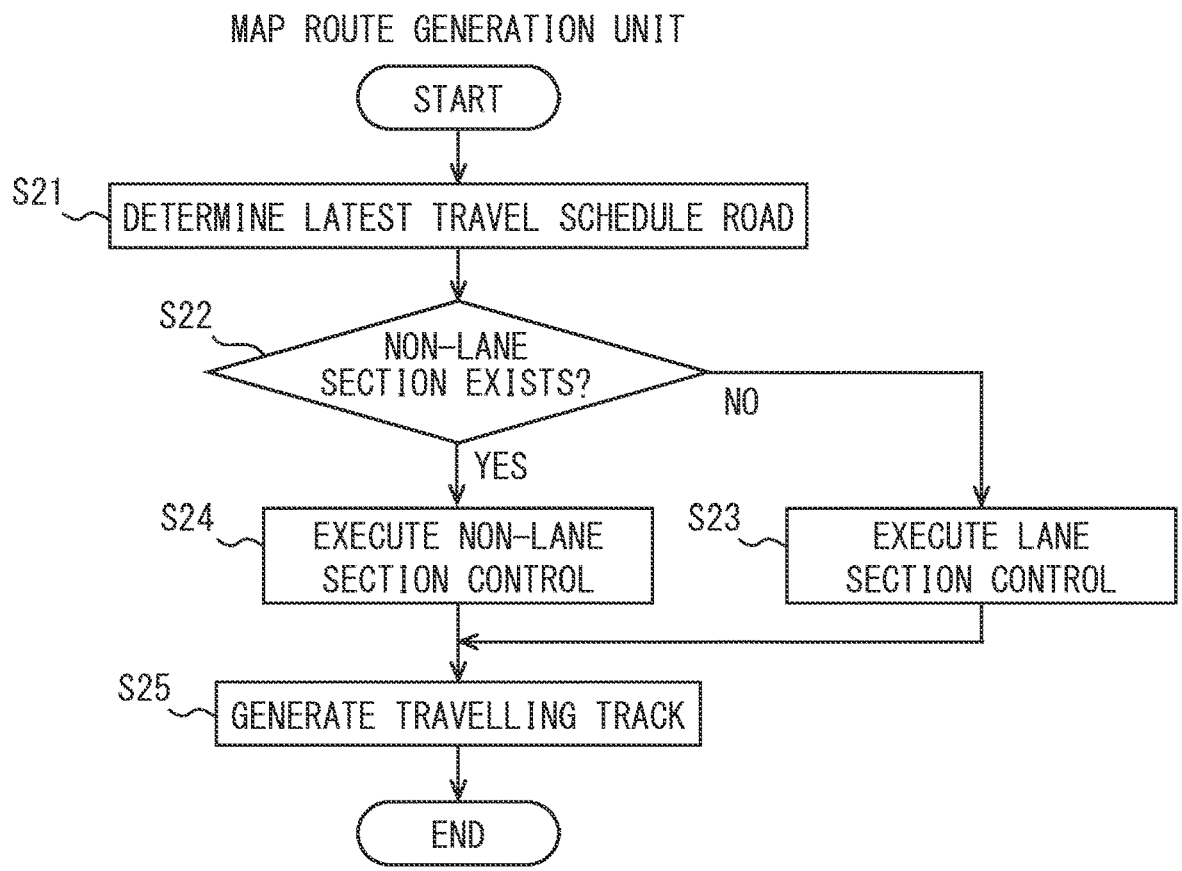
FIG. 4 is a diagram showing a process executed by the map route generation unit in FIG. 1.

The map track generation unit 164 generates a travel track of the vehicle 3 on a high-precision map. FIG. 4 shows a process executed by the map track generation unit 164. The map track generation unit 164 executes the process shown in FIG. 4 for each preset track generation cycle. The track generation cycle is the same as or longer than the cycle in which the map position estimation unit 163 estimates the current position.

In S21, the latest travel schedule road is determined. The latest travel schedule road is a road on which the vehicle 3 will travel from the current position when the vehicle travels by the length of the travel track or a little longer than that. Even if the vehicle 3 travels only to determine the latest travel schedule road, when the roads on which the vehicle travels are the same, the road currently being traveled is equal to the latest travel schedule road. If there is a branch point while the vehicle 3 travels only to determine the latest travel schedule road, and when the route is being guided, the vehicle travels along the guide route, and the latest travel schedule road is determined. If there is a branch point while the vehicle 3 travels only to determine the latest travel schedule road, and when the route guidance is not executed, a plurality of travel schedule roads passing through each of the branched roads are determined.

S22 is a process as a non-lane section determination unit. In S22, when the vehicle travels on the travel schedule road determined in S21 with reference to the high-precision map data and the position of the vehicle 3 on the high-precision map, it is determined whether or not there is a non-lane section NLS. If the determination result of S22 is "NO", the process proceeds to S23.

In S23, it is determined to execute the lane section control in the lane reference control. The lane section control is a normal lane reference control, and is a control executed when the lane marking line L exists on both the left and right sides of the lane in which the vehicle 3 travels. In the lane section control, the lane marking lines L on the left and right sides of the lane in which the vehicle 3 is traveling are detected by in-vehicle sensors such as the camera 110, and the position in the road width direction is determined on the road on which the vehicle 3 travels, based on the lane marking lines L on both the left and right sides.

When the determination result of S22 is "YES", the process proceeds to S24. In S24, it is determined to execute the non-lane section control in the lane reference control. The non-lane section control is a control in which a virtual lane marking line VL is generated for the non-lane section NLS, and the virtual lane marking line VL is used in place of the lane marking line L to perform the lane reference control.

If S23 or S24 is executed, the process proceeds to S25. S25 is a process as a traveling track generation unit. In S25, the lane marking line L or the virtual lane marking VL existing on both sides of the lane in which the vehicle 3 is traveling is referred to, and a traveling track in which the vehicle 3 is scheduled to travel is generated. The traveling track may be, for example, the center line in the road width direction of the lane marking line L or the virtual marking line VL existing on both sides of the lane in which the vehicle 3 is traveling. The length of the traveling track is, for example, several tens of meters to several hundreds of meters.

Figure 5:
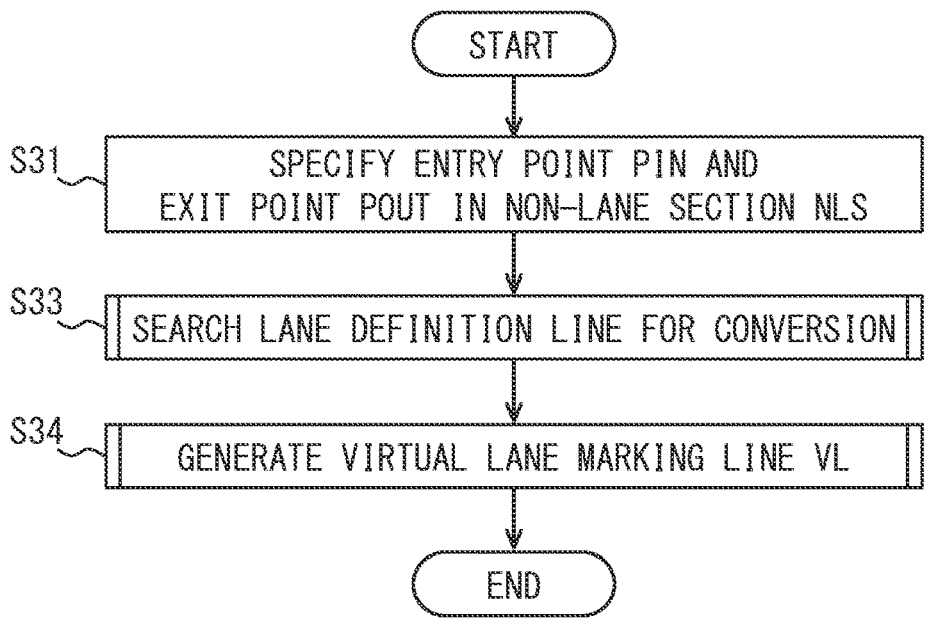
FIG. 5 is a diagram showing a process to be executed when it is determined to execute the non-lane section control.

When it is determined to execute the non-lane section control, the process shown in FIG. 5 is executed. In FIG. 5, S31 is a process as a point specifying unit. In S31, the map position estimation unit 163 refers to the high-precision map data extracted in S12, and specifies the coordinates of the entry point PIN and the exit point POUT of the non-lane section NLS. As shown in FIG. 2, there may be a plurality of exit points POUT. When there are a plurality of exit points POUT in the high-precision map data to be referred to and there are a plurality of travel schedule roads determined in S21, the coordinates of the exit point POUT are specified for each travel schedule road.

S33 is a process as a search unit, and, in S33, a lane definition line for conversion is searched using high-precision map data as a search target. The lane definition line is a line that defines the position of the lane in the width direction, and includes the lane marking line L and the road edge line.

Figure 6:
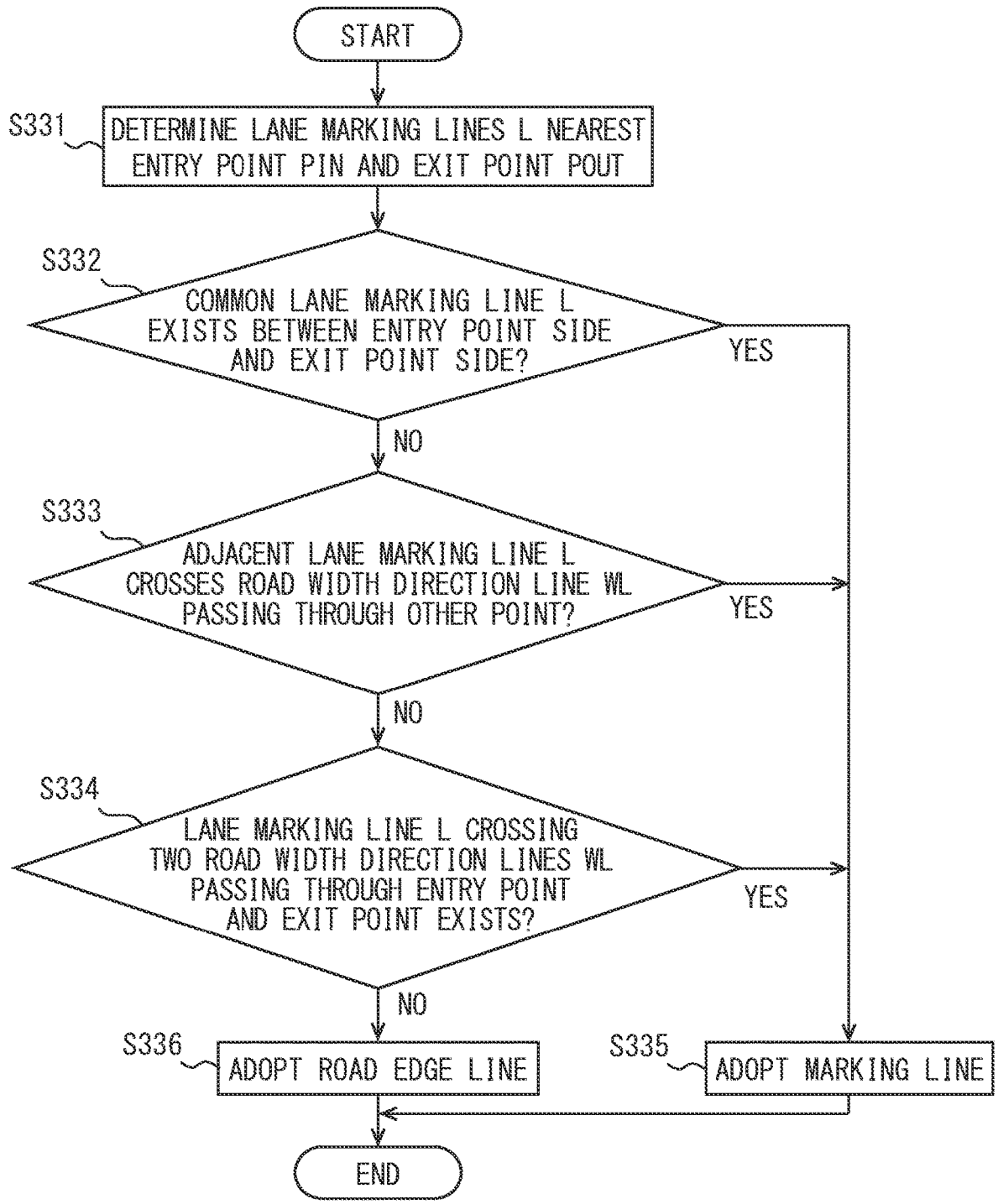
FIG. 6 is a diagram showing detailed processing of S33 in FIG. 5.

Specifically, in S33, the detailed processing shown in FIG. 6 is executed. In S331, the lane marking line L closest to the entry point PIN and the exit point POUT is determined. The distance between the entry point PIN or exit point POUT and the lane marking line L is the shortest distance between the entry point PIN or exit point POUT and the lane marking line L. That is, the radius of the circle when the circle centered on the entry point PIN or exit point POUT is in contact with the lane marking line L is the distance between the entry point PIN or exit point POUT and the lane marking line L.

The entry point PIN and the exit point POUT are set at positions where lane marking lines L are located on both sides of the lane. Therefore, the lane marking line L adjacent to the entry point PIN and the exit point POUT can be determined respectively. Further, normally, the entry point PIN and the exit point POUT are set at the center in the width direction of the lane. Therefore, two lane marking lines L adjacent to the entry point PIN and the exit point POUT are usually determined.

In S332, it is determined whether or not there is a common lane marking line L between the lane marking line L closest to the entry point PIN and the lane marking line L closest to the exit point POUT determined in S331. In other words, it is determined whether or not one of the lane marking lines L closest to the entry point PIN determined in S331 and one of the lane marking lines L closest to the exit point POUT are the same. The lane marking lines L closest to the entry point PIN are the lane marking lines L on both the left and right sides that defines the lane in which the entry point PIN is located. Further, the lane marking lines L closest to the exit point POUT are the lane marking lines L on both the left and right sides that defines the lane in which the exit point POUT is located. If the determination result of S332 is "YES", the process proceeds to S335, and it is determined to adopt the lane marking line L as the lane marking line L for conversion.

In the example of FIG. 2, the lane marking lines L adjacent to the entry point PIN are the lane marking line L1 and the lane marking line L3. When traveling to the left at the branch, the lane marking lines L adjacent to the exit point POUTA are the lane marking line L1 and the lane marking line L2. In this case, the lane marking line L1 becomes the lane marking line L common to the entry point PIN and the exit point POUTA. Further, when traveling to the right on the branch, the lane marking line L3 becomes the lane marking line L common to both the entry point PIN and the exit point POUTA. Therefore, in the case of the example shown in FIG. 2, the determination result of S332 is "YES".

Figure 7:
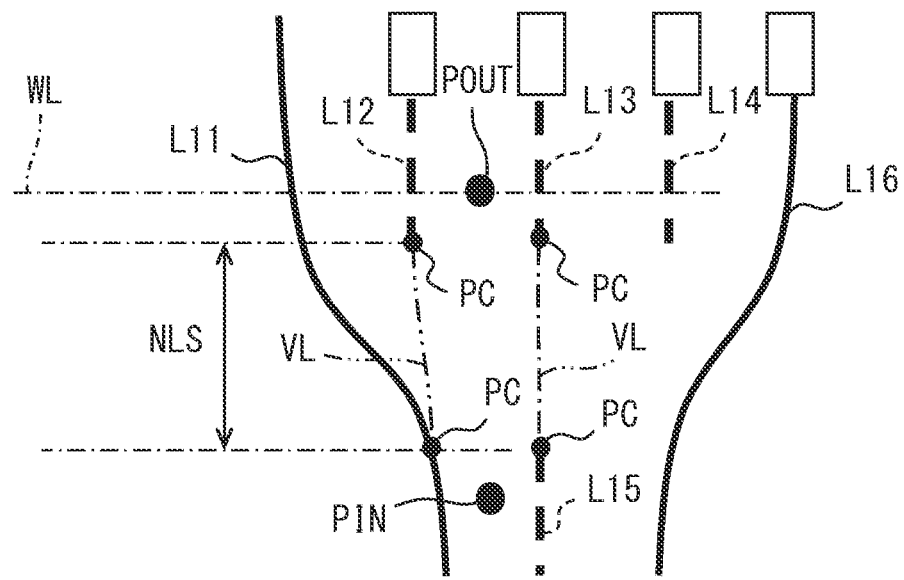
FIG. 7 is a diagram showing a non-lane section different from that of FIG. 2.

FIG. 7 illustrates another non-lane section NLS. The non-lane section NLS shown in FIG. 7 is a non-lane section NLS existing at the exit of the toll road. In FIGS. 7, L11, L12, L13, L14, L15, and L16 are lane marking lines L. It is assumed that the entry point PIN and the exit point POUT shown in the drawing are specified by the process of S31. The lane marking line L closest to the entry point PIN is the lane marking line L11 and the lane marking line L15. The lane marking line L closest to the exit point POUT is the lane marking line L12 and the lane marking line L13. Therefore, since there is no lane marking line L common to the lane marking line L closest to the entry point PIN and the lane marking line L closest to the exit point POUT, the determination result of S332 is "NO". If the determination result of S332 is "NO", the process proceeds to S333.

In S333, it is determined whether or not there is a lane marking line L that is the closest lane marking line L and intersects with the road width direction line WL passing through the other point of the entry point PIN and the exit point POUT. When there is a lane marking line L that is closest to the entry point PIN and intersects the road width direction line WL that passes through the exit point POUT, or there is a lane marking line L that is closest to the exit point POUT and intersects with the road width direction line WL passing through the entry point PIN, the determination result of S333 is "YES". In the example of FIG. 7, the lane marking line L11 intersects the road width direction line WL. Therefore, in the example of FIG. 7, the determination result of S333 is "YES". If the determination result of S333 is "YES", the process proceeds to S335, and it is determined to adopt the lane marking line L as the lane marking line L for conversion.

Figure 8:
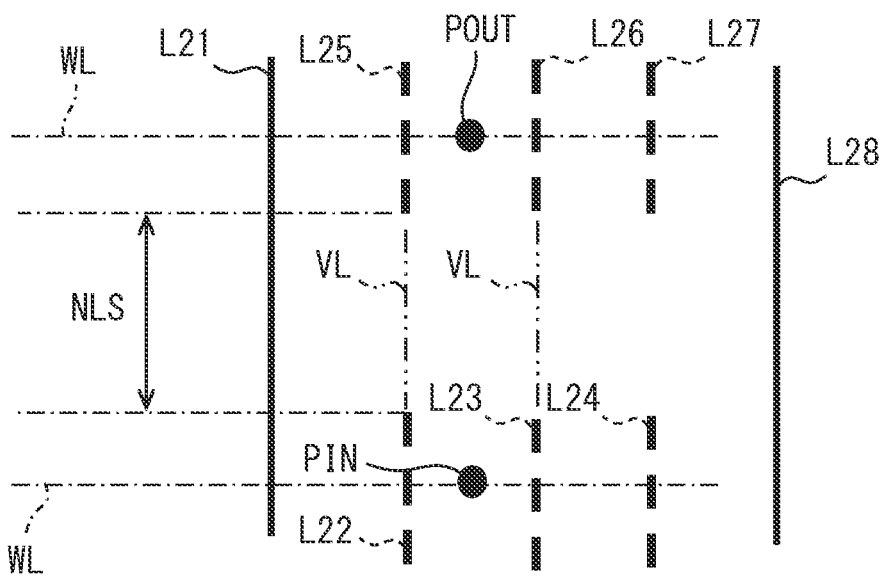
FIG. 8 is a diagram showing a non-lane section different from FIGS. 2 and 7.

If the determination result of S333 is "NO", the process proceeds to S334. In S334, it is determined whether or not there is a lane marking line L that intersects both the road width direction line WL passing through the entry point PIN and the road width direction line WL passing through the exit point POUT. FIG. 8 illustrates an non-lane section NLS different from that of FIGS. 2 and 7.

In FIGS. 8, L21, L22, L23, L24, L25, L26, L27, and L28 are lane marking lines L. It is assumed that the entry point PIN and the exit point POUT shown in the drawing are specified by the process of S31. The lane marking line L closest to the entry point PIN is the lane marking line L22 and the lane marking line L23. The lane marking line L closest to the exit point POUT is the lane marking line L25 and the lane marking line L26. In the example shown in FIG. 8, since there is no lane marking line L common to the lane marking line L closest to the entry point PIN and the lane marking line L closest to the exit point POUT, the determination result of S332 is "NO". Further, for these lane marking lines L22, L23, L25, and L26, the determination result of S333 is also "NO".

Therefore, in the case of the example of FIG. 8, the determination in S334 is executed. In the example of FIG. 8, the lane marking line L21 is a lane marking line L that intersects the two road width direction lines WL. Further, the lane marking line L28 is also a lane marking line L that intersects with the two road width direction lines WL. As described above, when there are a plurality of lane marking lines L for which the determination result of S334 is "YES", the lane marking line L close to the entry point PIN is adopted. Alternatively, the lane marking line L near the exit point POUT may be adopted.

If the determination result of S334 is "NO", the process proceeds to S336. In S336, it is determined to adopt the road edge line as the lane definition line for conversion. There are two road edge lines on the left and right sides, but in S336, the road edge line on the side closer to the entry point PIN and the exit point POUT is adopted. For example, in the example of FIG. 8, it is assumed that the lane marking lines L21 and L28 are not the lane marking lines L but the road edge lines. In this case, the road edge line at the position of the lane marking line L21 is adopted.

Figure 9:
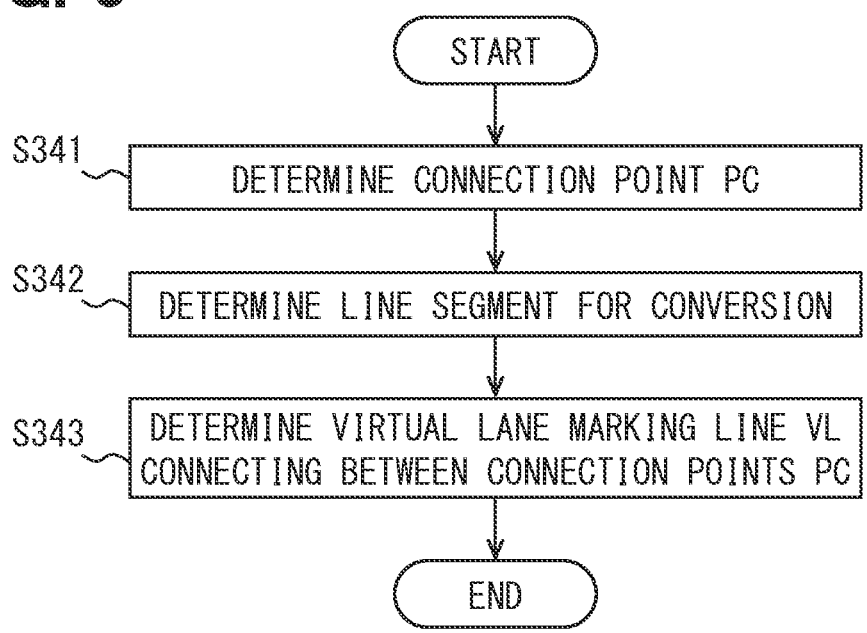
FIG. 9 is a diagram showing detailed processing of S34 in FIG. 5.

The description is returned to FIG. 5. After searching for the lane definition line for conversion in S33, the process proceeds to S34. S34 is a process as a virtual lane marking generation unit, and generates a virtual lane marking line VL. The processing of S34 is shown in detail in FIG. 9. In FIG. 9, in S341, the connection point PC to which the virtual lane marking VL is connected is determined. The connection point PC may be the point that is prepared by shifting the entry point PIN and the exit point POUT in the road width direction so as to overlap the lane marking line L that is not continuous between the entry point PIN and the exit point POUT. Further, it may be an end point on the NLS side of the non-lane section in the lane marking line L. FIG. 2 illustrates the connection point PC in the former case. FIG. 7 illustrates a connection point PC in the latter case.

In S342, a line segment for conversion is determined. The line segment for conversion is a line segment separated by the road width direction line WL passing through the connection point PC determined in S341 among the lane definition lines for conversion searched in S33.

In S343, the line segment for conversion determined in S342 is converted, and the virtual lane marking line VL connected between the two connection point PCs determined in S341 is determined. For the conversion process, for example, parallel movement, rotation movement, and enlargement/reduction processing are used. The enlargement/reduction processing may include not only scaling with the same vertical and horizontal ratios, but also scaling with different vertical and horizontal ratios. In addition, if the curve of the virtual lane marking line VL is not smooth, a smoothing process may be added.

FIG. 2, FIG. 7, and FIG. 8 show the virtual lane marking line VL determined in S343, respectively. In FIG. 2, the end of the lane marking line L2 on the non-lane section NLS side protrudes from the virtual lane marking line VL to the non-lane section NLS side. The portion protruding toward the NLS side of the non-lane section from the virtual lane marking line VL corresponding to the line L2 is treated as not existing in terms of control.

Next, the process executed by the traveling control unit 165 will be described. The travel control unit 165 executes lane reference control. In the lane reference control, the vehicle 3 is controlled so that the vehicle 3 travels along the traveling track generated in S25.

Figure 10:
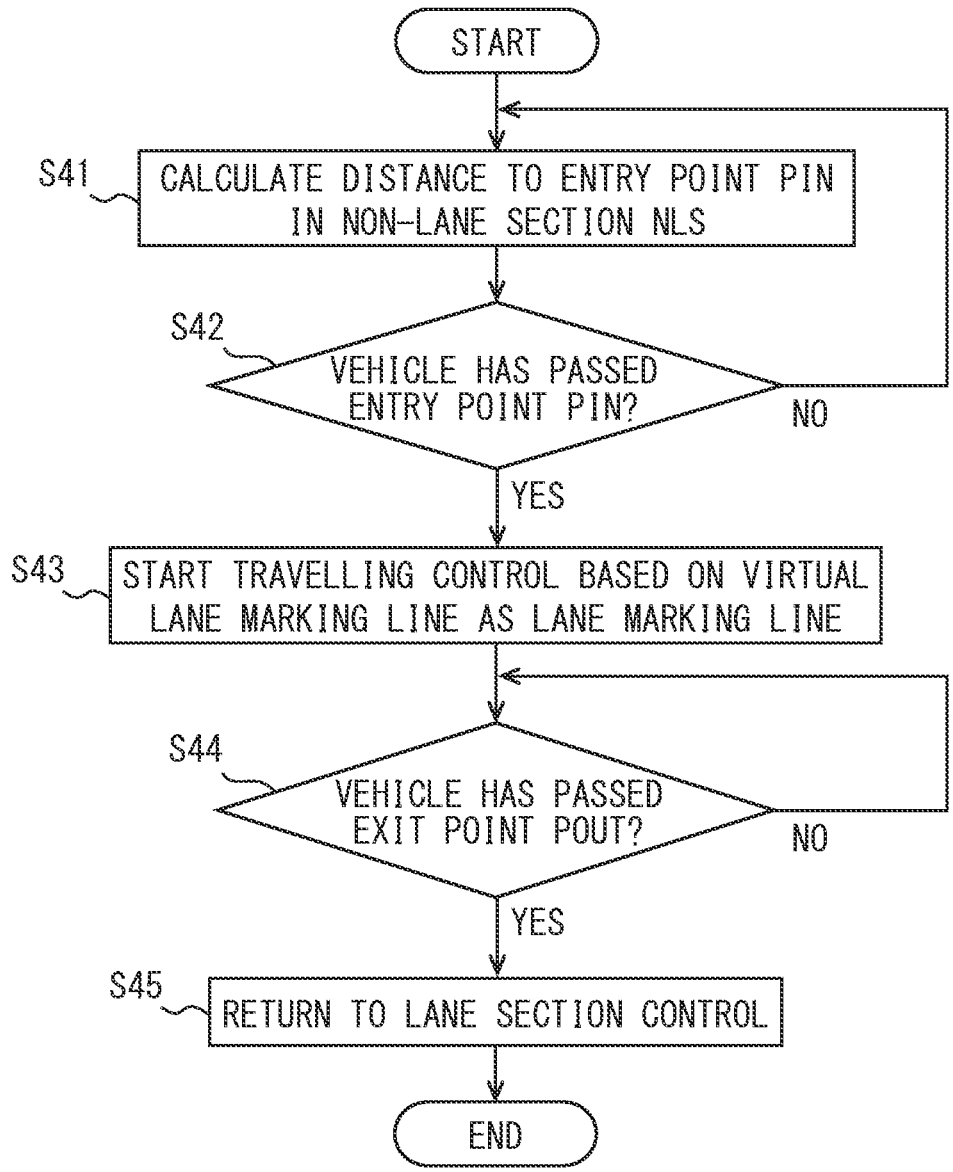
FIG. 10 is a diagram showing a process executed by the traveling control unit.

FIG. 10 shows a process executed by the traveling control unit 165 when it is determined in S24 of FIG. 4 to execute the non-lane section control.

In S41, the distance from the current position of the vehicle 3 and the high-precision map data to the start point of the non-lane section NLS is calculated. In S42, it is determined whether or not the entry point PIN has been passed. If the decision result at S42 is NO, the process returns to S41. While repeating S41 to S42, the lane section control is executed. On the other hand, when the determination result of S42 is YES, the process proceeds to S43.

In S43, the non-lane section control, that is, the traveling control using the virtual lane marking line VL set in advance before entering the non-lane section NLS as the lane marking line L is started. In S44, it is determined whether or not the vehicle 3 has passed the exit point POUT. If the determination result of S44 is NO, the determination of S44 is executed again while continuing the non-lane section control. If the determination result of S44 becomes YES, the process proceeds to S45. In S45, it returns to the lane section control.

Summary of Embodiment

The vehicle control device 100 of the present embodiment described above specifies the entry point PIN and the exit point POUT of the non-lane section NLS (at S31), and searches for the lane definition line to generate the virtual lane marking line VL based on the entry point PIN and the exit point POUT (at S33). Then, based on the searched lane definition line, a virtual lane marking line VL that connects the lane marking line L on the entry side and the lane marking line L on the exit side of the non-lane section NLS is generated (at S34).

In S25, this virtual lane marking line VL is treated in the same manner as the lane marking line L that actually exists to generate a traveling track. Therefore, even if there is a non-lane section NLS, it is possible to generate a traveling track in the same manner as in a section where there is actually a lane marking line L.

Further, since the vehicle control device 100 does not store the virtual lane marking line VL in the high-precision map data, it is possible to suppress an increase in the map data capacity.

Further, the vehicle control device 100 determines whether or not there is a non-lane section NLS on the travel schedule road of the vehicle 3 while the vehicle 3 is traveling (at S22), and generates the virtual lane marking VL with respect to the non-lane section NLS on the travel schedule road. By doing so, the amount of calculation can be reduced as compared with the case where the virtual lane marking VL is generated even for the non-lane section NLS on the road on which the vehicle 3 does not travel.

Further, in the present embodiment, the entry point PIN and the exit point POUT of the non-lane section NLS are stored in the high-precision map data, and when the virtual lane marking line VL is generated, the entry point PIN and the exit point POUT are specified by referring to the high-precision map data. Therefore, the virtual lane marking line VL can be generated more quickly than in the case where the process of setting the entry point PIN and the exit point POUT is required during traveling.

Second Embodiment

The second embodiment is different from the first embodiment in the method of specifying the exit point POUT. In the first embodiment, if the road on which the vehicle 3 travels has a branch and the route guidance is not executed, a plurality of travel schedule roads to pass through each of the branched roads are determined. Then, when there are a plurality of travel schedule roads, the coordinates of the exit point POUT are specified for each travel schedule road, and the virtual lane marking line VL is generated for each of all the specified exit points POUT.

On the other hand, in the second embodiment, when there are a plurality of exit point candidates, one exit point POUT is specified from the plurality of exit point candidates. The exit point candidate is a candidate for the exit point POUT to be combined with the entry point PIN to generate the line VL. The exit point candidate is an exit point POUT that can be combined with the entry point PIN when the entry point PIN is determined.

The exit point POUT that can be combined with the entry point PIN is the exit point POUT on the opposite side of the entry point PIN with one non-lane section NLS therebetween. The two exit points POUTA and POUTB shown in FIG. 2 are both exit points POUT that can be combined with the entry point PIN shown in FIG. 2. Although only one exit point POUT is shown in FIGS. 7 and 8, the exit point POUT also exists in the lane next to the exit point POUT shown in those drawings. For example, in FIG. 7, the exit point POUT also exists in the lane defined by the lane marking lines L11 and L12. The entry point PIN shown in FIGS. 7 and 8 also have a plurality of exit points POUT that can be combined.

Figure 11:
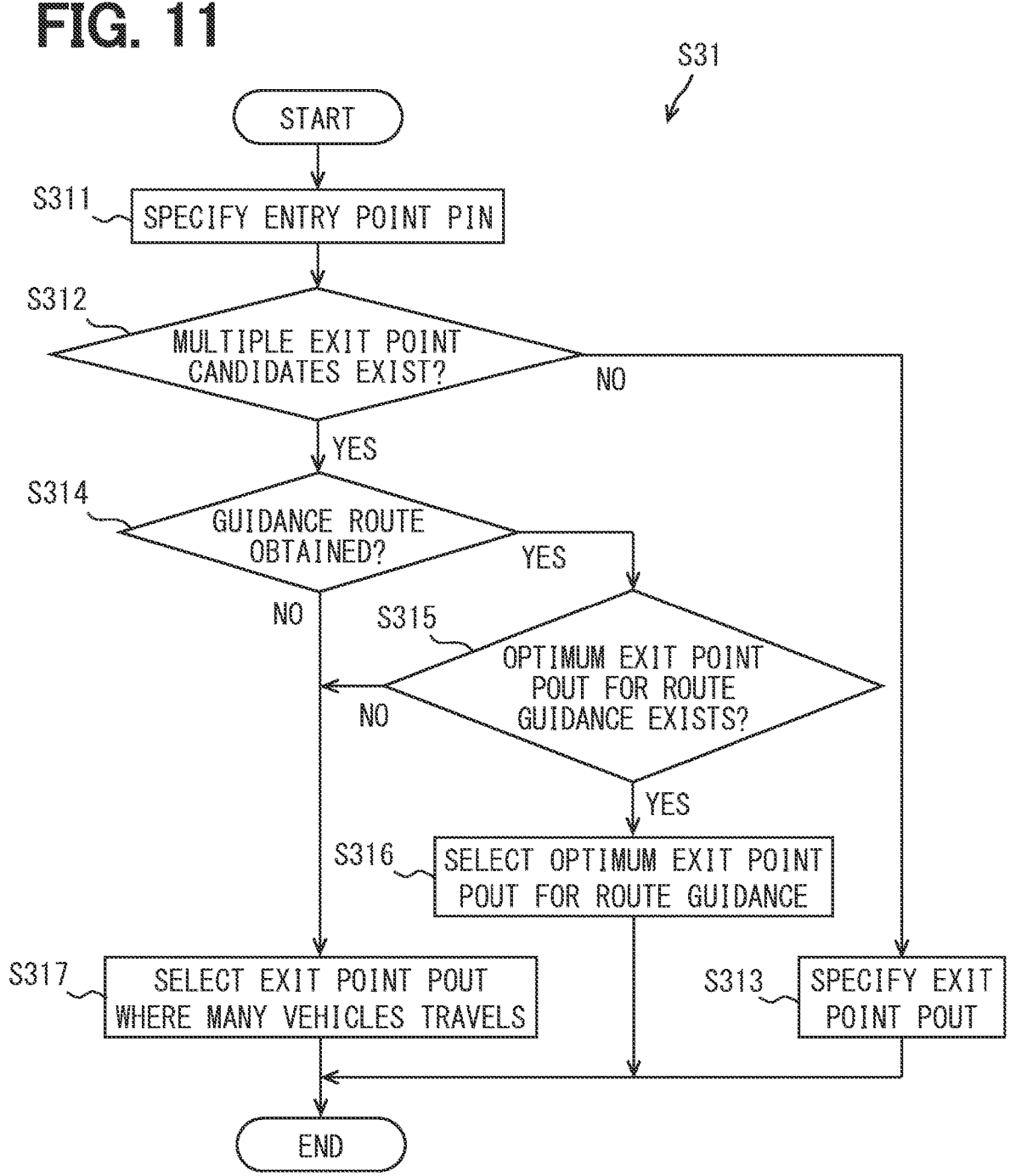
FIG. 11 is a diagram showing processing of a point specifying unit in the second embodiment.

FIG. 11 shows the processing of the point specifying unit in the second embodiment. The process shown in FIG. 11 is executed in S31 of FIG. 5. In S311, the coordinates of the entry point PIN on the latest travel schedule road are specified. The method of specifying the coordinates of the entry point PIN is the same as that of S31 of the first embodiment.

In S312, it is determined whether or not there are a plurality of exit point candidates. The exit point candidate here is an exit point POUT that can be combined with the entry point PIN determined in S311. If the determination result of S312 is "NO", the process proceeds to S313.

When proceeding to S313, only one exit point candidate can be combined with the entry point PIN specified in S311. In S313, the exit point candidate is specified as an exit point POUT used for searching the lane definition line.

When the determination result of S312 is "YES", the process proceeds to S314. In S314, the route guidance is executed in the vehicle 3, and it is determined whether or not the guidance route used in the route guidance can be acquired. The guidance route can be obtained from, for example, a route guidance device mounted on the vehicle 3. Further, the guidance route may be acquired from an information terminal having a route guidance function, for example, a smartphone, which is brought into the vehicle 3 and used. When the determination result of S314 is "YES", the process proceeds to S315.

In S315, the guide route is acquired, and it is determined whether or not there is one exit point POUT that is most suitable for the guide route among the plurality of exit point candidates. The optimum exit point POUT for the guidance route will be specifically described. In the example of FIG. 2, when the guide route is a path traveling to the left on the branch, the exit point POUTA becomes the optimum exit point POUT for the guide route. In the example of FIG. 7, there are a plurality of exit point candidates before the toll gate. Even if the route guidance is provided, it is usually not decided which toll gate is the most suitable for the route guidance. Therefore, in the example of FIG. 7, it may be determined that there is no optimum exit point POUT for the guide route.

It should be noted that, based on the direction indicated by the guidance route after passing through the toll gate, one exit point POUT optimal for the guidance route may be determined from a plurality of exit point candidates before the toll gate. Specifically, if the guidance route after passing through the toll gate indicates a straight direction, the exit point POUT in the lane in which the vehicle 3 travels straight at the entry point PIN may be the optimum exit point POUT for the guidance route. If it is shown that the guidance route after passing through the toll gate goes to the right, the rightmost exit point candidate among the plurality of exit point candidates is set as the optimum exit point POUT for the guidance route. If it is shown that the guidance route after passing through the toll gate goes to the left, the leftmost exit point candidate among the plurality of exit point candidates is set as the optimum exit point POUT for the guidance route.

In the example of FIG. 8, the non-lane section NLS and the sections before and after the non-lane section NLS are straight roads. The guide route in the section shown in FIG. 8 may often indicate a straight travel. When the guide route in the section shown in FIG. 8 indicates the straight travel, the exit point POUT in the lane in which the vehicle travels when traveling straight on the entry point PIN specified in S311 may be set as the optimum exit point POUT for the guide route. Here, if the guidance route indicates that the vehicle will turn left or right within a predetermined distance, the exit point POUT next to the lane going straight may be the optimum exit point for the guidance route. Further, since the road shown in FIG. 8 has no branching or merging, it can be considered that any exit point POUT may be passed. That is, in the example of FIG. 8, it may be determined that there is no one optimum exit point POUT for the guide route.

When the determination result of S315 is "YES", the process proceeds to S316. In S316, one of the plurality of exit point candidates, which is most suitable for the guide route, is selected as the exit point POUT used for searching the lane definition line.

In the processing of S314 to S316, as a rule for selecting one exit point from a plurality of exit point candidates (hereinafter referred to as an exit point selection rule), if a guide route can be acquired, an exit point POUT suitable for the guide route is selected. It means that the exit point selection rule of such is applied.

If the determination result of S314 is "NO", the process proceeds to S317. In S317, the exit point candidate in which the most vehicles are estimated to travel among the plurality of exit point candidates is selected as the exit point POUT used for searching the lane definition line. In this case, as the exit point selection rule, the exit point selection rule of selecting the exit point POUT where the most vehicles are estimated to travel is applied from among the plurality of exit candidate points.

A plurality of methods for selecting the exit point POUT, which is estimated that the most vehicles travel, will be described. The method described below can be used alone or in combination of a plurality of methods.

The first method is a method in which the exit point POUT estimated to be traveled by the largest number of vehicles is determined in advance for each approach point PIN. The exit point POUT, which is estimated to be travelled by the most vehicles, is determined in advance by the server 20.

The server 20 collects the travel trajectories of a large number of vehicles, and determines the exit point POUT on which the most vehicles travel among the plurality of exit point candidates for each entry point PIN based on the collected travel trajectories. Then, the information is included in the high-precision map data to be delivered to the vehicle 3. In S317, one exit point POUT is selected with reference to the high-precision map data.

A second method of selecting the exit point POUT, which is estimated to be travelled by the most vehicles among the plurality of exit point candidates, will be described. The second method is a method in which a lane type is included in the high-precision map data, and the exit point POUT estimated to be traveled by the largest number of vehicles is selected by using the lane type. An example of a lane type is the main lane. When the main lane is included as the lane type, the lane type can be used to distinguish between the main lane and lanes other than the main lane. There are branch lanes in lane types other than the main lane. Other examples of lane types other than the main lane include acceleration lanes, deceleration lanes, and climbing lanes. When the main lane and the non-main lane can be distinguished by the lane type, the exit point POUT on the main lane is set as the exit point POUT where the most vehicles are estimated to travel.

The third method is a method in which the exit point POUT capable of traveling with the least kinetic energy among the plurality of exit point candidates is set as the exit point POUT estimated to be traveled by the largest number of vehicles. The exit point POUT where the degree to which the vehicle traveling to the entry point PIN changes the traveling direction is the smallest may be set as the exit point POUT which requires the least kinetic energy. Further, if there is a height difference between the plurality of exit point candidates, the exit point POUT with the smallest height difference from the entry point PIN may be set as the exit point POUT with the least kinetic energy.

The first method, the second method, and the third method may be used in combination. For example, when the exit point POUT estimated to be travelled by many vehicles cannot be selected by the first method, the second method and the third method may be used in order. Alternatively, the third method may be used when the exit point POUT, which is estimated to be travelled by many vehicles, cannot be selected by the first method.

Alternatively, only the third method may be used in S317. The third method may also be used as an exit point selection rule different from the rule for selecting the exit point POUT where the most vehicles are estimated to travel.

When the exit point POUT is specified or selected in S313, S316, and S317, the process proceeds to S33 in FIG. 5. After S33, the same processing as in the first embodiment is executed.

In this second embodiment, when there are a plurality of exit point candidates ("YES" in S312), one exit point POUT is selected from the plurality of exit point candidates based on a preset exit point selection rule. When there are a plurality of exit point candidates, the amount of calculation can be suppressed rather than generating a virtual lane marking line VL for all the exit point candidates.

Although the embodiments have been described above, the disclosed technology is not limited to the above-described embodiment, and the following modifications are included in the present disclosure, and various modifications can be made without departing from the spirit of the present disclosure. In the following description, elements having the same reference symbols as those used so far are the same as elements having the same reference symbols in the above embodiment, except when specifically mentioned. When only a part of the configuration is described, the embodiment described above can be applied to other parts of the configuration.

First Modification

In the embodiment, the entry point PIN and the exit point POUT of the non-lane section NLS are stored in the high-precision map data. Alternatively, the entry point PIN and the exit point POUT may be determined based on the position of the lane marking line L stored in the high-precision map data.

For example, the position of the entry point PIN in the road longitudinal direction is set to a position where the non-lane section NLS starts, that is, a position where the lane marking line L is interrupted, or a position before a predetermined distance from that position. The position of the entry point PIN in the road width direction may be the center in the width direction of the lane. Similarly, the position of the exit point POUT in the road longitudinal direction is set to a position where the non-lane section NLS ends, that is, a position where the lane marking line L re-starts, or a position advanced by a predetermined distance from that position. The position of the exit point POUT in the road width direction is the center in the width direction of the lane.

By doing so, it is not necessary to store the entry point PIN and the exit point POUT in the high-precision map data. Therefore, the data capacity of the high-precision map data can be further reduced.

Second Modification

In the embodiment, an example in which the vehicle control device 100 mounted on the vehicle 3 functions as a traveling track generation device has been described. Alternatively, the traveling track generation device may not be mounted on the vehicle 3. For example, the server 20 may function as a traveling track generation device. Further, the traveling track may not need to be generated while the vehicle 3 is traveling, and the traveling track may be generated before traveling.

Third Modification

The control unit 160 and the method described in the present disclosure may be implemented by a special purpose computer including a processor programmed to perform one or more functions embodied by a computer program. Alternatively, the control unit 160 and the method described in the present disclosure may be implemented by a dedicated hardware logic circuit. Alternatively, the control unit 160 and the method described in the present disclosure may be implemented by one or more dedicated computers configured by a combination of a processor executing a computer program and one or more hardware logic circuits. The hardware logic circuits may be, for example, ASIC or FPGA.

The storage medium for storing the computer program is not limited to ROM. Alternatively, the computer program may be stored in a computer-readable, non-transitory tangible storage medium as instructions to be executed by a computer. For example, the program may be stored in a flash memory.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S11. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A travelling track generation device comprising:
   a point specifying unit configured to specify an entry point and an exit point for a non-lane section of a traffic lane in which no lane marking line is disposed on at least one of a right side and a left side in a width direction of a road, and the traffic lane is not defined by a lane marking line;
   a search unit configured to
      search for a lane definition line based on the entry point and the exit point, the lane definition line comprising a line that defines a position of a lane in the width direction, the lane definition line being continuous in a longitudinal direction of the road from a side of the entry point to a side of the exit point, and
      determine whether a lane marking line closest to the entry point and a lane marking line closest to the exit point are a same marking line;
   a virtual lane marking line generation unit configured to generate, based on the lane definition line, a virtual lane marking line that connects a lane marking line on an entry side of the non-lane section, which corresponds to the entry point, and a lane marking line on an exit side of the non-lane section, which corresponds to the exit point, wherein the virtual lane marking line is generated using the same lane marking line based on the search unit determining that the lane marking line closest to the entry point and the lane marking line closest to the exit point are the same lane marking line; and
   a travelling track generation unit configured to generate a travelling track as a trajectory on which a vehicle is scheduled to travel, based on the virtual lane marking line.

2. The travelling track generation device according to claim 1, further comprising:
   a non-lane section determination unit that determines whether a travel schedule road of the vehicle includes the non-lane section while the vehicle is traveling, wherein:
   when the non-lane section determination unit determines that the travel schedule road includes the non-lane section, the virtual lane marking line generation unit generates the virtual lane marking line with respect to the non-lane section.

3. The travelling track generation device according to claim 1, wherein:
   coordinates of the entry point and the exit point are stored in a map data; and
   the point specifying unit specifies the entry point and the exit point according to the map data.

4. The travelling track generation device according to claim 1, wherein:
   a map data stores a position of the lane marking line; and
   the point specifying unit specifies the entry point and the exit point of the non-lane section based on the position of the lane marking line stored in the map data.

5. The travelling track generation device according to claim 1, wherein:
   when there are a plurality of exit points that are combined with the entry point, the point specifying unit specifies one of the exit points from the plurality of exit points based on a predetermined exit point selection rule.

6. The travelling track generation device according to claim 5, wherein:
   the exit point selection rule includes a rule for selecting the exit point that matches a guidance route when the guidance route for guiding the vehicle is acquired.

7. The travelling track generation device according to claim 5, wherein:
   the exit point selection rule includes a rule for selecting the exit point that is estimated to be travelled by most vehicles.

8. The travelling track generation device according to claim 7, wherein:
   when the plurality of exit points that are combined with the entry point include the exit point on a main lane and the exit point other than the main lane, the exit point on the main lane is set to be the exit point that is estimated to be travelled by the most vehicles.

9. The travelling track generation device according to claim 5, wherein:
   the exit point selection rule includes a rule of selecting the exit point that has a minimum degree with which the vehicle traveling to the entry point changes a traveling direction, among the plurality of exit points that are combined with the entry point.

10. The travelling track generation device according to claim 1, wherein:
    the search unit searches the lane definition line using a map data as a search target along a road width direction at the entry point and the exit point.

11. The travelling track generation device according to claim 10, wherein:
    when the lane marking line closest to the entry point and the lane marking line closest to the exit point are not the same lane marking line, the search unit determines whether the lane marking line closest to one of the entry point and the exit point intersects with a road width direction line passing through the other of the entry point and the exit point; and when the lane marking line closest to one of the entry point and the exit point intersects with the road width direction line passing through the other of the entry point and the exit point, the virtual lane marking line generation unit generates the virtual lane marking line using the lane marking line closest to the one of the entry point and the exit point.

12. The travelling track generation device according to claim 11, wherein:

when the lane marking line closest to one of the entry point and the exit point does not intersect with the road width direction line passing through the other of the entry point and the exit point, the search unit determines whether a lane marking line exists to intersect with both the road width direction line passing through the entry point and the road width direction line passing through the exit point; and when the lane marking line exists to intersect with both the road width direction line passing through the entry point and the road width direction line passing through the exit point, the virtual lane marking line generation unit generates the virtual lane marking line using the lane marking line intersecting with both the road width direction lines.

13. The travelling track generation device according to claim 12, wherein:

when the lane marking line does not exist to intersect with both the road width direction line passing through the entry point and the road width direction line passing through the exit point, the virtual lane marking line generation unit generates the virtual lane marking line using one of road edge lines closer to the entry point and the exit point between the road edge lines disposed on a right side and a left side of the road.

14. The travelling track generation device according to claim 1, further comprising:

one or more processors; and a memory coupled to the one or more processors and storing program instructions that when executed by the one or more processors cause the one or more processors to provide at least: the point specifying unit; the search unit; the virtual lane marking line generation unit; and the travelling track generation unit.

15. A travelling track generation method comprising:

specifying an entry point and an exit point for a non-lane section of a traffic lane in which no lane marking line is disposed on at least one of a right side and a left side in a width direction of a road, and the traffic lane is not defined by a lane marking line;

searching for a lane definition line based on the entry point and the exit point, the lane definition line comprising a line that defines a position of a lane in the width direction, the lane definition line being continuous in a longitudinal direction of the road from a side of a specified entry point to a side of a specified exit point;

determining whether a lane marking line closest to the entry point and a lane marking line closest to the exit point are a same marking line;

generating, based on the lane definition line, a virtual lane marking line that connects a lane marking line on an entry side of the non-lane section, which corresponds to the entry point, and a lane marking line on an exit side of the non-lane section, which corresponds to the exit point, wherein the virtual lane marking line is generated using the same lane marking line based on determining that the lane marking line closest to the entry point and the lane marking line closest to the exit point are the same lane marking line; and generating a travelling track as a trajectory on which a vehicle is scheduled to travel, based on the virtual lane marking line.

\* \* \* \* \*